US00RE40651E

(19) United States
(12) Reissued Patent
Huntington et al.

(10) Patent Number: US RE40,651 E
(45) Date of Reissued Patent: Mar. 10, 2009

(54) LABILE BROMINE FIRE SUPPRESSANTS

(75) Inventors: John H. Huntington, Monument, CO (US); Peter D. Haaland, Louisville, CO (US)

(73) Assignee: Eclipse Aviation Corporation, Albuquerque, NM (US)

(21) Appl. No.: 10/893,705
(22) Filed: Jul. 16, 2004

Related U.S. Patent Documents

Reissue of:
(64) Patent No.: 5,626,786
Issued: May 6, 1997
Appl. No.: 08/423,209
Filed: Apr. 17, 1995

(51) Int. Cl.
*A62D 1/08* (2006.01)
*A62D 1/00* (2006.01)

(52) U.S. Cl. ..... 252/2; 252/3; 252/4; 252/5; 252/8; 169/46; 169/47

(58) Field of Classification Search ..... 252/8
See application file for complete search history.

(56) References Cited

U.S. PATENT DOCUMENTS

| | | | | | |
|---|---|---|---|---|---|
| 955,316 | A | * | 4/1910 | Breslauer | 169/47 |
| 2,732,410 | A | * | 1/1956 | Farlow et al. | 570/150 |
| 2,791,490 | A | | 5/1957 | Willcox | |
| 2,918,125 | A | | 12/1959 | Sweetman | |
| 3,076,507 | A | | 2/1963 | Sweetman | |
| 3,266,674 | A | * | 8/1966 | Martin | 222/146.5 |
| 3,372,208 | A | * | 3/1968 | Waters et al. | 528/108 |
| 3,479,286 | A | * | 11/1969 | Gambaretto et al. | 252/8 |
| 3,637,022 | A | | 1/1972 | Kelly et al. | |
| 3,657,030 | A | * | 4/1972 | Porter | 438/703 |
| 3,663,283 | A | | 5/1972 | Herbert et al. | |
| 3,812,239 | A | | 5/1974 | Swaney | |
| 3,903,037 | A | * | 9/1975 | Deets | 524/228 |
| 3,959,741 | A | | 5/1976 | Meinzer | |
| 3,985,689 | A | * | 10/1976 | Ferguson | 521/77 |
| 4,022,872 | A | | 5/1977 | Carson et al. | |
| 4,043,950 | A | | 8/1977 | Wilmsen et al. | |
| 4,048,290 | A | | 9/1977 | Lee | |
| 4,125,161 | A | | 11/1978 | Chammas | |
| 4,129,513 | A | * | 12/1978 | Stangroom | 252/78.1 |
| 4,241,042 | A | | 12/1980 | Matijevic et al. | |
| 4,250,960 | A | | 2/1981 | Chammas | |
| 4,292,290 | A | | 9/1981 | Tunison | |
| 4,397,977 | A | * | 8/1983 | Sandler | 524/288 |
| 4,406,797 | A | | 9/1983 | Altman et al. | |
| 4,415,029 | A | | 11/1983 | Pratt et al. | |
| 4,428,430 | A | | 1/1984 | Terrell et al. | |
| 4,481,119 | A | | 11/1984 | Rhein et al. | |
| 4,494,601 | A | | 1/1985 | Pratt et al. | |
| 4,619,318 | A | | 10/1986 | Terrell et al. | |
| 4,819,728 | A | | 4/1989 | Lafitte | |
| 4,822,513 | A | * | 4/1989 | Corby | 510/234 |
| 4,889,187 | A | | 12/1989 | Terrell et al. | |
| 4,949,789 | A | | 8/1990 | Lafitte | |
| 4,971,146 | A | * | 11/1990 | Terrell | 166/55 |
| 5,017,525 | A | | 5/1991 | Birchall et al. | |
| 5,055,208 | A | | 10/1991 | Stewart et al. | |
| 5,080,177 | A | * | 1/1992 | Robin et al. | 169/46 |
| 5,082,575 | A | | 1/1992 | Yamaguchi | |
| 5,084,190 | A | * | 1/1992 | Fernandez | 252/8 |
| 5,093,013 | A | * | 3/1992 | Sprague | 252/8 |
| 5,120,689 | A | | 6/1992 | Birchall et al. | |
| 5,135,054 | A | * | 8/1992 | Nimitz et al. | 169/46 |
| 5,165,916 | A | | 11/1992 | Cheng et al. | |
| 5,219,474 | A | * | 6/1993 | Song et al. | 252/8 |
| 5,236,611 | A | * | 8/1993 | Shiflett | 252/67 |
| 5,287,920 | A | | 2/1994 | Terrell | |
| 5,320,174 | A | | 6/1994 | Terrell et al. | |
| 5,444,102 | A | * | 8/1995 | Nimitz et al. | 521/131 |
| 5,491,028 | A | | 2/1996 | Sarin et al. | |
| 5,520,826 | A | | 5/1996 | Reed, Jr. et al. | |
| 5,562,764 | A | | 10/1996 | Gonzalez | |
| 5,573,744 | A | | 11/1996 | Gebben et al. | |

FOREIGN PATENT DOCUMENTS

| | | |
|---|---|---|
| JP | 56-9230 | 1/1981 |
| SU | 981338 | 6/1981 |
| WO | WO 93/15794 | 8/1993 |

OTHER PUBLICATIONS

Final Technical Report FR–4021 Halogen Replacement for Aviation Systems, Peter D. Haaland & John H. Huntington, May 1994–Nov. 1994.*

Chemical Abstracts No. 117:134014, "Preparation of a Fire Extinguishing Composition", Valukonis et al. (1991).*

Chemical Abstracts No 98:129086. "Combustion inhibitor for hydrocarbon–air Mixture", Petrova et al. (1982).*

CRC Handbook of Chemistry and Physics, 63rd Edition, pp. B–84, B–97, B–106, B–125, B–127, B–143, B–157, B–159 and C–525, (1982).*

Hawley's Condensed Chemical Dictionary, 11th Edition, pp. 164, 169, 170, 173,329,642,913, and 1040, Van Nostrand Reinhold Company, N.Y. (1987).*

W.A. Rosser, et al., The Quenching of Premixed Flames by Volatile Inhibitors, Combustion and Flame, Mar. 1966, 287–294, Butterworths, London.

G. Lask & H. GG. Wagner, Influence of Additives on the Velocity of Laminar Flames, 8th Symposium (International) on Combustion, 1962, 432–438, Williams & Wilkens Co., Baltimore.

The Montreal Protocol on Substances that Deplete the Ozone Layer, 2000, 1–47, UNEP Ozone Secretariat UN Environment Programme, Kenya.

A.N. Baratov, A Review of Investigations on the Chemical Inhibition of Flames, Problems in Combustion and Extinguishment, 1968, 29–51, TsNIIPO MOOP, Moscow.

W.A. Rosser, et al., The Effect of Metal Salts on Premixed Hydrocarbon—Air Flames, Combustion and Flame, Mar. 1963, 107–119, Vol. 7, Butterworths, London.

D. R. Miller, et al., Effects of Various Inhibitors on Hydrogen—Air Flame Speeds, Combustion and Flame, Mar. 1963, 137–142, vol. 7, Buttersworths, London.

Letter dated Aug. 15, 2006, from T. Howard to J. Sawtelle.

Letter dated Aug. 18, 2006, from J. Sawtelle to T. Howard.

* cited by examiner

*Primary Examiner*—Joseph D. Anthony
(74) *Attorney, Agent, or Firm*—Michael Best & Friedrich LLP

(57) ABSTRACT

A class of fire suppressant compounds which have labile bromine atoms bound to atoms other than carbon have been discovered to be more effective at suppressing fires than Halon 1211 and Halon 1301. Moreover, this class of fire suppressant compounds hydrolyze or oxidize rapidly in the troposphere and as a consequence thereof, they have minimal ozone depletion potential.

54 Claims, No Drawings

LABILE BROMINE FIRE SUPPRESSANTS

Matter enclosed in heavy brackets [ ] appears in the original patent but forms no part of this reissue specification; matter printed in italics indicates the additions made by reissue.

GOVERNMENT RIGHTS

This invention was made with support by the U.S. Government. The Government may have certain rights in this invention.

BACKGROUND OF THE INVENTION

1. Field of the Invention

The present invention generally relates to prevention and extinguishment of fires of combustible materials by utilizing a composition of matter group which is highly efficient and environmentally friendly. More particularly, the invention relates to prevention and extinguishment of fires of combustible materials by using a group of fire suppressants having labile bonds between bromine atoms and atoms other than carbon.

2. Description of the Prior Art

Fire suppression by halogenated alkanes is well-established in both the scientific literature and commercial practice as taught, for example, in R. G. Gann ed., Halogenated Fire Suppressants, ACS Symposium Series 16 (American Chemical Society, Washington, D.C.) 1975. The two most widely used halogenated suppressants are Halon 1301 ($CF_3Br$) and Halon 1211 ($CF_2ClBr$). These compounds are very stable, so they survive long enough in the troposphere to be gradually transported to the stratosphere, where they are photolyzed by solar ultraviolet radiation to produce free radicals that catalyze ozone depletion as taught, for example, in J. G. Anderson, D. W. Toohey, and W. F. Brune, Science, 251, 39 (1991). Production of these materials has therefore been internationally prohibited after January, 1994 by the Montreal Protocol on Substances that Deplete the Ozone Layer. The problem is therefore to find fire suppression materials and methods which are at least as effective as Halon 1301 and Halon 1211 but which do not deplete the ozone layer.

Representative of the prior art directed to the use of fluorocarbons which have no chlorine or bromine in U.S. Pat. No. 5,236,611 (Shiflet). These fluorocarbons are slowly transported into the stratosphere, but the catalytic efficiency of fluorine is very much smaller than that of chlorine, bromine, or iodine.

Representative of the prior art directed to the use of hydrogenated halocarbons, which are less stable than Halon 1301 or Halon 1211 in the troposphere, are U.S. Pat. Nos. 5,084,190 (Fernandez), 5,135,054 (Nimitz et al.); 5,093,013 (Sprague); and 5,080,177 (Robin et al.). It is well known that Halons containing chlorine or bromine will suppress fires in smaller quantities than those which contain only fluorine. However, it is understood by people practiced in the art of combustion that the principal source of heat release in hydrocarbon combustion is oxidation of hydrogen atoms to form water vapor. Thus hydrogenated halocarbons are expected to act chemically both as fuels and as fire suppressants.

SUMMARY OF THE INVENTION

In accordance with the teachings of the present invention compositions of matter having labile bromine atoms bound to atoms other than carbon have been discovered to have improved fire suppressant properties and to be environmentally friendly. Compounds which release bromine atoms and are commonly used as brominating agents in organic synthesis such as phosphorous tribromide ($PBr_3$), thionyl bromide ($SOBr_2$), boron tribromide ($BBr_3$), and the like are very efficient at extinguishing fires. Moreover, they hydrolyze or oxidize rapidly in the troposphere and consequently they have no stratospheric ozone depletion potential.

Additionally included in this class of fire suppressant compounds of labile bromine atoms bound to atoms other than carbon are silicon tetrabromide ($SiBr_4$), titanium tetrabromide ($TiBr_4$), iodine bromide (IBr), phosphorous oxybromide ($POBr_3$), bromine trifluoride ($BrF_3$), bromine pentafluoride ($BrF_5$), N-bromosuccinimide ($C_4H_4O_2NBr$) {the bromine is bound to nitrogen, not carbon}, nitrosyl bromide (NOBr), chlorine bromide (ClBr), and cuprous bromide (CuBr). These compounds are used as brominating agents in chemical synthesis as taught, for example, in the Merck Index, ninth edition, (Merck & Co., Rahway, N.J., 1976) or suffer thermal decomposition with liberation of bromine at temperatures less than 200 degrees centigrade.

Examples of non-labile bromine compositions are found in such high-melting, ionically bound salts as lithium bromide (LiBr, m.p. 547° C.), calcium bromide ($CaBr_2$, m.p. 730° C.), or chromous bromide ($CrBr_2$, m.p. 842° C.), and other bromine-containing compositions that are thermally and oxidatively stable according to criteria familiar to people practiced in the art of synthetic chemistry.

In order to extinguish fires with a composition having one or more compounds of the aforesaid class of fire suppressants, equipment for delivering the composition incorporates such factors as specific geometry, gas flow, and flame conditions. A method of delivery of a composition having one or more liquid compounds of the aforesaid class of fires suppressants may employ a nonflammable, pressurized gas to propel the composition through a nozzle to the flame. Another method of delivery of liquid compositions may employ a deflagrating solid, gas-generating cartridge, such as is found in automotive airbags, to propel a mist of liquid to the flame. A third method for delivery of liquid compositions may employ a pressurized liquid propellant such as liquid carbon dioxide or liquid argon to atomize and direct a mist of suppressant onto the flame. Other methods for propelling powders or slurries of solid materials of the aforesaid class may employ a deflagrating solid gas generating cartridge and a wider nozzle such as would be used for an ordinary shotgun cartridge. Other methods for propelling gaseous materials of the aforesaid class may employ mixtures with pressurized inert propellants to aid transport of suppressant to the flame.

The primary advantage of the use of the class of fire suppressants of this discovery is to extinguish fires more efficiently with smaller volumes and masses of extinguishant than existing fire suppressants, without depleting the stratospheric ozone layer. $PBr_3$, $POBr_3$, $SOBr_2$, $BBr_3$, and the like react rapidly with water vapor or liquid to produce mild acids which precipitate with normal rain and are ultimately neutralized in soils. The short lifetimes of these materials also reduce toxicity of the suppressants since their simple acid decomposition products pose no chronic risk to pH buffered, living organisms.

These and other advantages and attainments of the present invention will become apparent to those skilled in the art upon a reading of the detailed description wherein there are described several embodiments of the invention.

DESCRIPTION OF THE PREFERRED EMBODIMENTS

In accordance with the teachings of the present invention a class of fire suppressants which have labile bromine atoms bound to atoms other than carbon are shown in Table I. These compounds are more effective at suppressing fire than Halon 1301 or Halon 1211 and have no ozone depletion potential.

The effectiveness of the class of suppressants described herein is a result of the relative ease with which bromine atoms are liberated in a flame environment. Halons 1301 and 1211 also liberate bromine atoms in a flame; however, the strength of the C—Br bond in these materials requires higher temperatures or longer interaction times than the compositions of matter described herein. The stability of the Halons against oxidation or hydrolysis in the troposphere is one indication of the stability of the C—Br bond. The compositions of matter described herein are not stable in the presence of water, oxygen, or heat, liberating bromine atoms under these conditions and thereby providing a catalyst for flame suppression.

Another indication of the stability of the C—Br bond is the measurement of its bond dissociation energy of 68 kilocalories per mole as taught by A. H. Sehon and M. Szwarc (Proceedings of the Royal Society (London), page 110, [1951]). This energy is larger than the bond energy of typical P—Br bonds (63 kcal/mole), I—Br bonds (43 kcal/mole), or S—Br bonds (52 kcal/mole) as taught by Streitweiser and Heathcock, Introduction to Organic Chemistry, (Macmillan:NY), 1976 and Cotton and Wilkinson, Advanced Inorganic Chemistry, (3rd ed. Wiley:NY), 1972. As is known to people practiced in the art of chemistry the interpretation of bond dissociation energies involves approximations based on the nature of the full molecular fragments ($XY_n$) from which bromine is liberated according to the reaction:

$$Y_nX—Br \rightarrow Y_nX+Br.$$

Thus lower average bond energies indicate the possibility of labile bonds in a group of materials, but further experimentation with specific materials is required to establish the lability of the bond compared with Halons.

TABLE I

| Composition | Phase | % Br | Comments |
|---|---|---|---|
| $Pbr_3$ | liquid | 88 | brominating agent |
| $POBr_3$ | liquid | 83 | brominating agent |
| $SOBr_3$ | liquid | 77 | brominating agent |
| $BrF_3$ | liquid | 58 | reactive solvent |
| $BrF_5$ | liquid | 46 | reactive solvent |
| $FBr_5$ | solid | 92 | brominating agent |
| $TiBr_4$ | solid | 87 | reacts with water |
| $SiBr_4$ | liquid | 92 | reacts with water |
| IBr | solid | 39 | decomposes at 116° C. |
| CuBr | solid | 29 | brominating agent |
| NOBr | gas | 73 | brominating agent |
| BrF | gas | 81 | boils at −20° C. |
| $C_4H_4O_2NBr$ | solid | 44.9 | decomposes at 170° C. |
| $BBr_3$ | liquid | 96 | boils at 90° C. |
| BrCl | gas | 70 | decomposes at 10° C. |

In one embodiment of the invention liquid $SOBr_2$ is introduced as an air-pressurized mist into a 500,000 Btu/hr fire resulting from kerosene flowing at a rate of 4 grams per second through a nozzle with cross-flowing compressed air to atomize the liquid into a fine mist. The fire is contained in a flame holder whose volume is approximately 8 liters and is further blown by an atmospheric cross-wind of 40 miles per hour. The fire is reproducibly and irreversibly extinguished with less than one gram of $SOBr_2$ in less than 0.2 seconds as confirmed by videotape records of the experiments. The same fire is not reproducibly suppressed with aliquots of 25 grams of $CF_3Br$ added to the same location.

In another embodiment of the invention 0.2 cubic centimeters of $PBr_3$ is mixed with 0.7 cubic centimeters of liquid carbon dioxide. The liquid $CO_2$ propels the $PBr_3$ through a valve and into the flame zone, generated as herein above described, as it is opened, irreversibly and completely extinguishing the flame in the presence of flowing fuel, air, and hot surfaces.

Extinguishment of a similar fire, with a hydrocarbon fuel burn rate of 12 grams per second, by Halon 1301 is taught by Alvarez in chapter 3 of Gann (ibid.) to require between 90 and 130 grams per second of $CF_3Br$ for suppression. Another example of a gasoline fire with similar heat output is taught by Ford in chapter 1 of Gann (ibid.) to require between 500 and 1500 grams of Halon 1301 for suppression. Another fire, in which 10 grams per second of jet fuel are burned in fast-flowing air at the Air Force Flight Dynamics Laboratory Engine Nacelle test facility (Wright-Patterson AFB, OH) requires between one and three kilograms of Halon 1301 for reproducible suppression. In each of these examples the quantity of Halon 1301 required to suppress a similar fire is between 100 and 1000 times greater than that required of the compositions of matter described herein above, of which $SOBr_2$ and $PBr_3$ are specific embodiments.

The labile bromine atoms and high proportion of bromine in the composition of matter listed in Table I provide a more efficient fire suppression formulation than the Halons, which typically have less bromine by weight (Halon 1301 and 1211 are 54% and 48% Br, respectively) and lesser proclivity for liberating bromine atoms when thermally or chemically activated in a combustion environment.

Methods for dispersing gas, liquid, or solid suppressants require designs based upon such factors as specific geometry of the locus of the fire, flow properties of the fire suppressants, and flame conditions of the fire. For example, fine mists of liquid are transported by fluid-dynamical drag forces along flow streamlines in the nacelle of an aircraft engine. The mists vaporize in hot zones, liberating bromine atoms by pyrolysis in precisely the regions where the heat released by combustion is most intense. Inasmuch as the drag coefficient is inversely proportional to the droplet diameter, as is known to people practiced in the art of fluid dynamics, there is a range of aerosol size distributions which most effectively deliver specific suppressants to specific fires. Another such factor for a gaseous composition is the mixing of suppressant flow with turbulent flames in a well-ventilated fire, which is affected by the delivery pressure, the nozzle contour and orientation, the mass-flow rate of the suppressant, and the fluid dynamical properties of the fire. Dispersing methods designed for suppressing fire in the nacelle of a jet engine differ from dispersing methods designed for suppressing fire in the engine compartment of a motor vehicle, the flu of a chimney, or the gas-handling manifold of a semiconductor processing clean-room.

Methods for preventing and extinguishing fires of jet fuel using a composition of matter class which is highly efficient and environmentally friendly is also disclosed by the present inventors in Final Technical Report FR-4021 (US Air Force Phase I SBIR Contract F33615-94-C-5005, November 1994).

Although preferred embodiments of the invention have been described, it will be understood that within the scope of this invention various changes may be made in the amount of fire suppressant, the composition of a fire suppressant mixture, and the method for dispersing fire suppressants which is generally stated consist of a class of fire suppressants and methods of dispersing such fire suppressants capable of carrying out the objects set forth as disclosed in the appended claims.

What is claimed is:

1. A fire suppressant composition consisting essentially of: at least one brominated, non-carbon compound *in a liquid state* selected from the group consisting of $PBr_3$[$POBr_3$, $SOBr_2$, $BrF_3$, $BrF_5$, $PBr_5$, $TiBr_4$, $SiBr_4$, IBr, CuBr, NOBr, BrF,] and $BBr_3$[, which is combined with]*; and* a propellant *combined with the compound for propelling the composition* such that [the ozone depletion potential of ] *sufficient bromine atoms are liberated from the composition to suppress a fire, wherein* the composition [is less than 0.1] *has no ozone depletion potential*.

[2. The fire suppressant composition of claim 1 wherein ozone depletion potential is defined on a scale where the ozone depletion caused by $CFl_3$ is 1.0.]

3. [A] *The* fire suppressant composition [consisting of at least one labile brominated compound selected from the group consisting of $PBr_3$, $POBr_3$, $SOBr_2$, $BrF_3$, $BrF_5$, $TiBr_4$, $SiBr_4$, IBr, CuBr, NOBr, BrF, $BBr_3$, and BrCl, which is combined with a] *of claim 1, wherein the* propellant *is* selected from the group consisting of $CO_2$, $N_2$, *and* compressed air[and HCFC-123 ($CF_3CCl_2H$)].

[4. The fire suppressant composition of claim 3 wherein ozone depletion potential of the propellant equals 0.016.]

*5. The composition of claim 1 wherein said brominated compound is $PBr_3$.*

*6. The composition of claim 1 wherein said brominated compound is $BBr_3$.*

*7. The composition of claim 1 wherein the propellant is nonflammable.*

*8. The composition of claim 7 wherein said brominated compound is $PBr_3$.*

*9. The composition of claim 7 wherein said brominated compound is $BBr_3$.*

*10. The composition of claim 1 wherein said brominated compound is not stable in, and said sufficient bromine atoms are liberated in, the presence of oxygen.*

*11. The composition of claim 10 wherein said liberated bromine atoms are sufficient to catalytically suppress the fire.*

*12. The composition of claim 1 wherein said brominated compound is not stable in, and said sufficient bromine atoms are liberated in, the presence of heat.*

*13. The composition of claim 12 wherein said liberated bromine atoms are sufficient to catalytically suppress the fire.*

*14. The composition of claim 1 wherein said brominated compound is not stable in, and said sufficient bromine atoms are liberated in, the presence of water.*

*15. The composition of claim 14 wherein said liberated bromine atoms are sufficient to catalytically suppress the fire.*

*16. The composition of claim 1 wherein the ratio of the volume of propellant to the volume of brominated compound is 7 to 2.*

*17. The composition of claim 1 wherein the quantity of the composition required to suppress a fire is between 100 and 1000 times less than the quantity of $CF_3Br$ required to suppress the fire.*

*18. The composition of claim 5 wherein said brominated compound is not stable in, and said sufficient bromine atoms are liberated in, the presence of oxygen.*

*19. The composition of claim 18 wherein said liberated bromine atoms are sufficient to catalytically suppress the fire.*

*20. The composition of claim 5 wherein said brominated compound is not stable in, and said sufficient bromine atoms are liberated in, the presence of heat.*

*21. The composition of claim 20 wherein said liberated bromine atoms are sufficient to catalytically suppress the fire.*

*22. The composition of claim 5 wherein said brominated compound is not stable in, and said sufficient bromine atoms are liberated in, the presence of water.*

*23. The composition of claim 22 wherein said wherein said liberated bromine atoms are sufficient to catalytically suppress the fire.*

*24. The composition of claim 5 wherein the ratio of the volume of propellant to the volume of brominated compound is 7 to 2.*

*25. The composition of claim 24 wherein the quantity of the composition required to suppress a fire is between 100 and 1000 times less than the quantity of $CF_3Br$ required to extinguish the fire.*

*26. The composition of claim 1 wherein the propellant is a non-flammable, pressurized gas.*

*27. The composition of claim 1 wherein the propellant is a deflagrating, solid, gas-generating cartridge.*

*28. The composition of claim 1 wherein the propellant is a pressurized liquid.*

*29. The composition of claim 5 wherein the propellant is a non-flammable, pressurized gas.*

*30. The composition of claim 5 wherein the propellant is a deflagrating, solid, gas-generating cartridge.*

*31. The composition of claim 5 wherein the propellant is a pressurized liquid.*

*32. A fire suppressant composition consisting essentially of $PBr_3$ in a liquid state and a propellant combined with the $PBr_3$ for propelling the composition to catalytically suppress a fire, wherein the composition has no ozone depletion potential.*

*33. The fire suppressant composition of claim 32, wherein the propellant is selected from the group consisting of $CO_2$, $N_2$, and compressed air.*

*34. The composition of claim 32 wherein the propellant is nonflammable.*

*35. The composition of claim 32 wherein the $PBr_3$ is not stable in the presence of oxygen.*

*36. The composition of claim 32 wherein the $PBr_3$ is not stable in the presence of heat.*

*37. The composition of claim 32 wherein the $PBr_3$ is not stable in the presence of water.*

*38. The composition of claim 32 wherein the ratio of the volume of propellant to the volume of $PBr_3$ is 7 to 2.*

*39. The composition of claim 32 wherein the quantity of the composition required to suppress a fire is between 100 and 1000 times less than the quantity of $CF_3Br$ required to suppress the fire.*

*40. The composition of claim 32 wherein the propellant is a non-flammable pressurized gas.*

*41. The composition of claim 32 wherein the propellant is a deflagrating, solid, gas-generating cartridge.*

*42. The composition of claim 32 wherein the propellant is a pressurized liquid.*

*43. A fire suppressant composition consisting essentially of $PBr_3$ in a liquid state and a propellant combined with the $PBr_3$ for propelling the composition to an aircraft engine, such that sufficient bromine atoms are liberated from the composition to suppress a fire in the aircraft engine, wherein the composition has no ozone depletion potential.*

*44. The fire suppressant composition of claim 43, wherein the propellant is selected from the group consisting of $CO_2$, $N_2$, and compressed air.*

*45. The composition of claim 43 wherein the propellant is nonflammable.*

*46. The composition of claim 43 wherein the $PBr_3$ is not stable in the presence of oxygen.*

*47. The composition of claim 46 wherein said wherein said liberated bromine atoms are sufficient to catalytically suppress the fire.*

*48. The composition of claim 43 wherein the $PBr_3$ is not stable in the presence of heat.*

*49. The composition of claim 48 wherein said wherein said liberated bromine atoms are sufficient to catalytically suppress the fire.*

*50. The composition of claim 43 wherein the $PBr_3$ is not stable in the presence of water.*

*51. The composition of claim 50 wherein said wherein said liberated bromine atoms are sufficient to catalytically suppress the fire.*

*52. The composition of claim 43 wherein the ratio of the volume of propellant to the volume of $PBr_3$ is 7 to 2.*

*53. The composition of claim 43 wherein the quantity of the composition required to suppress a fire is between 100 and 1000 times less than the quantity of $CF_3Br$ required to suppress the fire.*

*54. The composition of claim 43 wherein the propellant is a non-flammable, pressurized gas.*

*55. The composition of claim 43 wherein the propellant is a deflagrating, solid, gas-generating cartridge.*

*56. The composition of claim 43 wherein the propellant is a pressurized liquid.*

* * * * *